W. W. Hart,
Making Spoons.
Nº 4,505.          Patented May 9, 1846.
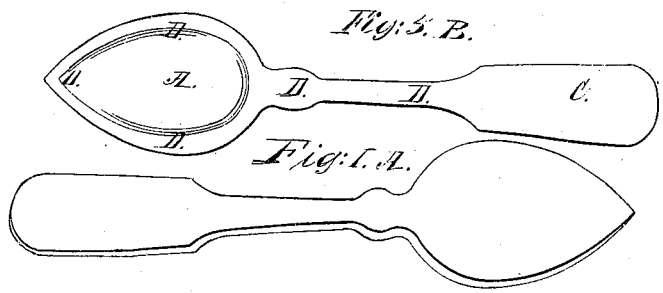
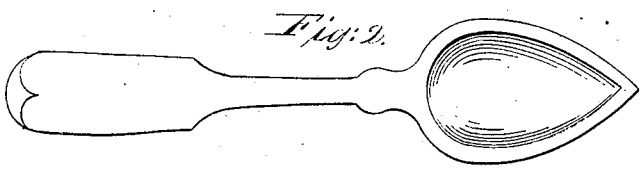
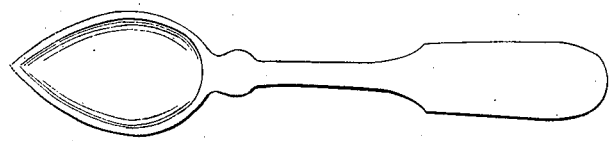
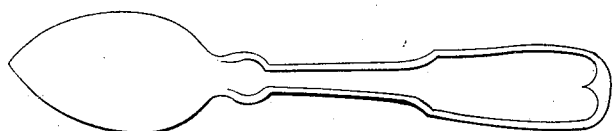
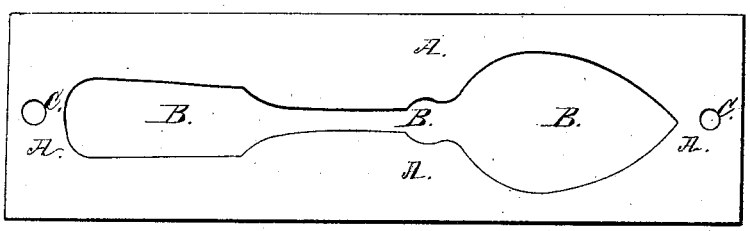
Witnesses:                Inventor:
Henry B. Adams        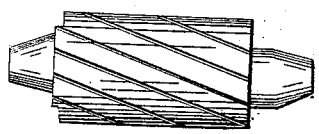     Walter W. Hart
Isaac Winslow

UNITED STATES PATENT OFFICE.

WALTER W. HART, OF FREEHOLD, NEW JERSEY.

MANUFACTURE OF SPOONS.

Specification of Letters Patent No. 4,505, dated May 9, 1846.

*To all whom it may concern:*

Be it known that I, WALTER W. HART, of Freehold, in the county of Monmouth and State of New Jersey, have invented a new and Improved Mode of Making Spoons, Ladles, Knives, Forks, Sugar-Tongs and other Like Metallic Wares; and I do hereby declare that the following is a full and exact description.

The nature of my invention consists in manufacturing spoons, ladles, knives, forks, sugar-tongs and other like articles from silver or other malleable metals, by means of swaging or raising metal (which has been rolled to a uniform thickness) from a level even surface, to an uneven surface that the parts which are made prominent may be cut off. All the parts of the metal which are required to be made more or less thin, must be more or less raised; the more it is raised the thinner it can be cut without cutting those parts which are intended to be left of a full thickness.

The metal which is to be operated upon should be made of the same thickness as the thickest part of the spoon or other articles to be manufactured, and all the parts of the metal that is necessary to be taken off, to make it of a desirable thinness must be forced above the common level surface or above those parts which are to be left of a full thickness. The object of it is to raise up and cut off all those parts of the spoon (or other article to be manufactured) which in the usual methods are hammered thin.

To enable others skilled in the art to make and use my invention I will proceed to describe its construction and operation.

I take metal of uniform thickness and as thick as the thickest part of the spoon or other article to be manufactured. I then cut it out to the full size that a spoon is made when it is ready for raising to its proper shape for finishing, by means of dies and press, which cuts them in such exact shapes as will make it of the proper form when raised by dies or punches in the common way: Thus Figure 1 letter A represents the metal of uniform thickness and cut of a proper size for a large tea spoon. My next operation is to change it from a flat surface to a curved one by means of a swage placed in a drop or press which gives such a curve to the metal as is necessary, and forces out the parts required to be made thinner, just as much out of the line of the common level surface as they require to be reduced or made thinner as seen at Fig. 5 letter B where the light shades at A and C represent the parts raised (or forced from the common level) to be milled or cut off and made thin and the dark shades D D D D D the parts not raised or swaged and which are to be left thick. Fig. 2 represents the concaved side of the spoon to which is exactly adjusted a holder of cast iron or other metal to support the spoon while being milled off or made thinner; which holder Fig. 6 has a border A A A A embracing the edge of the spoon closely and confines it to B B B its place on the holder. While being milled off the said holder is secured by screws to the moving bed of the milling machine and made to pass under the revolving cutter (of my own invention as seen at Fig. 7 in the drawings) which cuts off the parts which are forced out of the line of the common level surface and makes the upper curved surface again level and smooth and the spoon of proper thickness for raising to its proper shape which is done in a top and bottom die made of steel so as to give a correct shape to the top and bottom sides of the spoon or the same may be done in the old way of a common punch in lead, after which it is to be finished in the ordinary way.

What I claim as my invention and desire to secure by Letters Patent is—

The forming of spoons from plate blanks by first striking up that part of the blank which is to form the bowl as described then planing off the convex side until it becomes flat or nearly so and finally subjecting the blank thus prepared to properly formed dies for giving shape to the spoon all substantially as herein set forth.

WALTER W. HART.

Witnesses:
R. K. MORSELL,
H. W. BALL, Jr.